US009004355B2

(12) United States Patent
Katz

(10) Patent No.: US 9,004,355 B2
(45) Date of Patent: Apr. 14, 2015

(54) SECURE SYSTEM AND METHOD TO PAY FOR A SERVICE PROVIDED AT A RESERVATION

(75) Inventor: Jeffrey Bart Katz, Durango, CO (US)

(73) Assignee: Cardfree Inc, San Francisco, CA (US)

( * ) Notice: Subject to any disclaimer, the term of this patent is extended or adjusted under 35 U.S.C. 154(b) by 271 days.

(21) Appl. No.: 12/616,450

(22) Filed: Nov. 11, 2009

(65) Prior Publication Data

US 2010/0057503 A1 Mar. 4, 2010

Related U.S. Application Data

(63) Continuation-in-part of application No. 11/239,731, filed on Sep. 29, 2005, now Pat. No. 8,622,292.

(51) Int. Cl.
| | | |
|---|---|---|
| G06K 5/00 | (2006.01) | |
| G06F 17/00 | (2006.01) | |
| G06K 15/00 | (2006.01) | |
| G06Q 10/00 | (2012.01) | |
| G06Q 50/00 | (2012.01) | |
| G06Q 20/00 | (2012.01) | |
| G06Q 40/00 | (2012.01) | |
| G06Q 20/40 | (2012.01) | |
| G06Q 10/02 | (2012.01) | |

(Continued)

(52) U.S. Cl.
CPC .............. *G06Q 20/40* (2013.01); *G06Q 10/02* (2013.01); *G06Q 20/24* (2013.01); *G06Q 30/02* (2013.01); *G07F 17/0014* (2013.01)

(58) Field of Classification Search
USPC .................. 705/5, 6, 40, 44, 64, 14.38, 14.37, 705/14.65, 16; 235/375, 378, 382, 380
See application file for complete search history.

(56) References Cited

U.S. PATENT DOCUMENTS

| 3,622,995 A | 11/1971 | Dilks et al. |
| 4,849,613 A | 7/1989 | Eisele |

(Continued)

FOREIGN PATENT DOCUMENTS

| JP | 03220698 | 9/1991 |
| JP | 2002312709 | 10/2002 |

OTHER PUBLICATIONS

Official Action for U.S. Appl. No. 11/239,731, mailed Apr. 5, 2010.

(Continued)

*Primary Examiner* — Daniel Walsh
(74) *Attorney, Agent, or Firm* — Jason H. Vick; Sheridan Ross, PC

(57) ABSTRACT

A method and system for allowing the setting of reservations and the pre-authorization of credit to purchase a desired service for which a reservation is made. A customer accesses a reservation system that is integrated with a credit authorization system. The customer may make a reservation and substantially simultaneously become pre-authorized to pay for services to be provided at the reservation by one of any number of credit providers. Pre-authorized credit and reservation information is then supplied to the service provider in advance of services being provided, expediting the overall transaction time and allowing for a secure and cardless transaction procedure. The reservation and preauthorization information are typically stored upon the reservation system and then passed to the point-of-sale systems, but other types of input/output storage devices could be used to perform this function.

20 Claims, 8 Drawing Sheets

(51) Int. Cl.
  *G06Q 20/24* (2012.01)
  *G06Q 30/02* (2012.01)
  *G07F 17/00* (2006.01)

(56) References Cited

U.S. PATENT DOCUMENTS

| | | | |
|---|---|---|---|
| 5,056,019 A | 10/1991 | Schultz et al. | |
| 5,126,541 A * | 6/1992 | Shinagawa | 235/438 |
| 5,191,523 A | 3/1993 | Whitesage | |
| 5,191,613 A | 3/1993 | Graziano et al. | |
| 5,253,165 A | 10/1993 | Leiseca et al. | |
| 5,375,055 A | 12/1994 | Togher et al. | |
| 5,404,291 A | 4/1995 | Kerr et al. | |
| 5,510,979 A | 4/1996 | Moderi et al. | |
| 5,541,394 A | 7/1996 | Kouchi et al. | |
| 5,636,270 A * | 6/1997 | Davey | 379/352 |
| 5,659,740 A | 8/1997 | Ezaki et al. | |
| 5,666,493 A | 9/1997 | Wojcik et al. | |
| 5,724,520 A * | 3/1998 | Goheen | 705/5 |
| 5,923,016 A | 7/1999 | Fredregill et al. | |
| 5,937,391 A | 8/1999 | Ikeda et al. | |
| 6,032,857 A | 3/2000 | Kitagawa et al. | |
| 6,045,039 A | 4/2000 | Stinson et al. | |
| 6,065,675 A | 5/2000 | Teicher | |
| 6,121,544 A * | 9/2000 | Petsinger | 174/353 |
| 6,208,978 B1 | 3/2001 | Walker et al. | |
| 6,283,366 B1 | 9/2001 | Hills et al. | |
| 6,510,418 B1 | 1/2003 | Case et al. | |
| 6,553,346 B1 | 4/2003 | Walker et al. | |
| 6,575,372 B1 * | 6/2003 | Everett et al. | 235/492 |
| 6,606,025 B1 * | 8/2003 | Staufer et al. | 340/10.4 |
| 6,621,425 B2 * | 9/2003 | Maeda | 341/50 |
| 6,717,686 B2 | 4/2004 | Farros et al. | |
| 6,738,751 B1 | 5/2004 | Richiusa | |
| 6,887,656 B2 | 5/2005 | Friedrich | |
| 6,988,657 B1 | 1/2006 | Singer et al. | |
| 6,993,503 B1 * | 1/2006 | Heissenbuttel et al. | 705/37 |
| 7,014,107 B2 | 3/2006 | Singer et al. | |
| 7,117,183 B2 | 10/2006 | Blair et al. | |
| 7,131,583 B2 | 11/2006 | Jaros et al. | |
| 7,257,554 B1 | 8/2007 | Glassman et al. | |
| 7,302,719 B2 | 12/2007 | Jaros et al. | |
| 7,360,691 B2 | 4/2008 | Takayama | |
| 7,472,074 B1 * | 12/2008 | Walker et al. | 705/26.82 |
| 7,689,468 B2 | 3/2010 | Walker et al. | |
| 7,930,721 B1 * | 4/2011 | Hernes | 725/78 |
| 8,005,468 B2 * | 8/2011 | Marolia et al. | 455/418 |
| 2001/0016825 A1 | 8/2001 | Pugliese et al. | |
| 2001/0023409 A1 | 9/2001 | Keil | |
| 2001/0027481 A1 | 10/2001 | Whyel | |
| 2001/0029485 A1 | 10/2001 | Brody et al. | |
| 2001/0029496 A1 | 10/2001 | Otto et al. | |
| 2001/0034623 A1 * | 10/2001 | Chung | 705/5 |
| 2001/0039524 A1 | 11/2001 | Harrison et al. | |
| 2001/0041053 A1 | 11/2001 | Abecassis | |
| 2001/0054010 A1 * | 12/2001 | Bernabeo et al. | 705/26 |
| 2002/0007327 A1 | 1/2002 | Steury et al. | |
| 2002/0023215 A1 * | 2/2002 | Wang et al. | 713/171 |
| 2002/0026348 A1 | 2/2002 | Fowler et al. | |
| 2002/0032784 A1 | 3/2002 | Darago et al. | |
| 2002/0050528 A1 * | 5/2002 | Everett et al. | 235/492 |
| 2002/0077953 A1 * | 6/2002 | Dutta | 705/37 |
| 2002/0088849 A1 * | 7/2002 | Nichols et al. | 235/379 |
| 2002/0099609 A1 | 7/2002 | Nascenzi et al. | |
| 2002/0111877 A1 | 8/2002 | Nelson | |
| 2002/0116235 A1 * | 8/2002 | Grimm et al. | 705/5 |
| 2002/0125990 A1 * | 9/2002 | Emmei | 340/5.6 |
| 2002/0143700 A1 | 10/2002 | Wu | |
| 2002/0156689 A1 | 10/2002 | Spalding | |
| 2002/0156696 A1 | 10/2002 | Teicher | |
| 2002/0194074 A1 | 12/2002 | Jacobs | |
| 2002/0198737 A1 | 12/2002 | Valtanen | |
| 2003/0003988 A1 | 1/2003 | Walker et al. | |
| 2003/0005055 A1 * | 1/2003 | Ralston et al. | 709/204 |
| 2003/0076939 A1 | 4/2003 | Timmins | |
| 2003/0101135 A1 * | 5/2003 | Myatt et al. | 705/40 |
| 2003/0110136 A1 | 6/2003 | Wells et al. | |
| 2003/0126094 A1 | 7/2003 | Fisher et al. | |
| 2003/0144889 A1 | 7/2003 | Niemi | |
| 2003/0149576 A1 * | 8/2003 | Sunyich | 705/1 |
| 2003/0195846 A1 | 10/2003 | Felger | |
| 2003/0204743 A1 * | 10/2003 | Devadas et al. | 713/200 |
| 2003/0208386 A1 * | 11/2003 | Brondrup | 705/5 |
| 2003/0228901 A1 | 12/2003 | Walker et al. | |
| 2004/0030896 A1 * | 2/2004 | Sakamura et al. | 713/169 |
| 2004/0171406 A1 | 9/2004 | Purk | |
| 2004/0176995 A1 | 9/2004 | Fusz | |
| 2004/0236674 A1 | 11/2004 | Chen et al. | |
| 2004/0243478 A1 * | 12/2004 | Walker et al. | 705/26 |
| 2004/0247092 A1 | 12/2004 | Timmins et al. | |
| 2005/0004818 A1 | 1/2005 | Liman | |
| 2005/0039209 A1 * | 2/2005 | Klebanoff et al. | 725/78 |
| 2005/0075957 A1 | 4/2005 | Pincus et al. | |
| 2005/0173517 A1 | 8/2005 | Suk et al. | |
| 2005/0219051 A1 * | 10/2005 | Nedblake | 340/572.1 |
| 2005/0240484 A1 * | 10/2005 | Yan et al. | 705/26 |
| 2005/0279827 A1 | 12/2005 | Mascavage et al. | |
| 2006/0016878 A1 | 1/2006 | Singer et al. | |
| 2006/0068767 A1 * | 3/2006 | Bhakta et al. | 455/418 |
| 2006/0073883 A1 | 4/2006 | Franks, Jr. | |
| 2006/0089877 A1 * | 4/2006 | Graziano et al. | 705/14 |
| 2006/0145863 A1 * | 7/2006 | Martin et al. | 340/572.8 |
| 2006/0184398 A1 * | 8/2006 | Kasagi | 705/5 |
| 2006/0190309 A1 * | 8/2006 | Ewart et al. | 705/7 |
| 2006/0235754 A1 | 10/2006 | Walker et al. | |
| 2006/0250252 A1 * | 11/2006 | Nagai et al. | 340/572.7 |
| 2006/0252524 A1 | 11/2006 | Friesen et al. | |
| 2006/0277078 A1 * | 12/2006 | Ohmori et al. | 705/5 |
| 2006/0287897 A1 * | 12/2006 | Sobalvarro et al. | 705/5 |
| 2007/0038481 A1 | 2/2007 | Darr | |
| 2007/0083400 A1 * | 4/2007 | Katz | 705/5 |
| 2007/0089168 A1 | 4/2007 | Wang et al. | |
| 2007/0105617 A1 * | 5/2007 | Walker et al. | 463/25 |
| 2007/0156470 A1 * | 7/2007 | Granucci et al. | 705/5 |
| 2007/0273519 A1 * | 11/2007 | Ichikawa et al. | 340/572.1 |
| 2007/0288326 A1 | 12/2007 | Boldin | |
| 2008/0004949 A1 | 1/2008 | Flake et al. | |
| 2008/0021772 A1 | 1/2008 | Aloni et al. | |
| 2008/0021788 A1 | 1/2008 | Dodson et al. | |
| 2008/0046325 A1 | 2/2008 | Suk | |
| 2008/0048025 A1 | 2/2008 | Fitzgerald et al. | |
| 2008/0052235 A1 | 2/2008 | Mascavage et al. | |
| 2008/0056488 A1 * | 3/2008 | Motoyama | 380/29 |
| 2008/0071587 A1 | 3/2008 | Granucci et al. | |
| 2008/0091557 A1 * | 4/2008 | Cella et al. | 705/26 |
| 2008/0093027 A1 * | 4/2008 | Niwa et al. | 156/387 |
| 2008/0215381 A1 * | 9/2008 | Reiter | 705/5 |
| 2008/0215382 A1 * | 9/2008 | Lutnick et al. | 705/5 |
| 2008/0215447 A1 * | 9/2008 | Lutnick et al. | 705/15 |
| 2008/0238689 A1 * | 10/2008 | Ohashi | 340/572.8 |
| 2008/0294556 A1 | 11/2008 | Anderson | |
| 2009/0030885 A1 * | 1/2009 | DePasquale et al. | 707/3 |
| 2009/0055695 A1 * | 2/2009 | Maddali | 714/724 |
| 2009/0076922 A1 * | 3/2009 | de Gruil | 705/16 |
| 2009/0160613 A1 * | 6/2009 | Hirota | 340/10.1 |
| 2009/0237221 A1 * | 9/2009 | Battles et al. | 340/10.51 |
| 2010/0004959 A1 * | 1/2010 | Weingrad | 705/5 |
| 2010/0023455 A1 | 1/2010 | Dispensa et al. | |
| 2010/0057503 A1 * | 3/2010 | Katz | 705/5 |
| 2010/0145855 A1 * | 6/2010 | Fordyce et al. | 705/44 |
| 2010/0205091 A1 * | 8/2010 | Graziano et al. | 705/40 |
| 2011/0004557 A1 * | 1/2011 | Wang et al. | 705/67 |
| 2011/0093324 A1 * | 4/2011 | Fordyce et al. | 705/14.27 |
| 2011/0103564 A1 * | 5/2011 | Couse | 379/201.03 |
| 2011/0166995 A1 * | 7/2011 | Fuerstenberg et al. | 705/40 |
| 2012/0089491 A1 * | 4/2012 | Weber et al. | 705/30 |
| 2013/0090959 A1 | 4/2013 | Kvamme et al. | |
| 2014/0046846 A1 * | 2/2014 | Dogin et al. | 705/44 |
| 2014/0149290 A1 | 5/2014 | Katz | |
| 2014/0172472 A1 * | 6/2014 | Florimond et al. | 705/5 |

OTHER PUBLICATIONS

New Orleans Steamboat Company http://web.archive.org/web/20041224003516/http://www.steamboatnatchez.com/reservations/index.html Dec. 13, 2004.

(56) References Cited

OTHER PUBLICATIONS

Official Action for U.S. Appl. No. 11/239,731 mailed Dec. 24, 2008.
Official Action for U.S. Appl. No. 11/239,731 mailed Jun. 22, 2009.
Official Action for U.S. Appl. No. 11/239,731 mailed Nov. 5, 2009.
Notice of Allowance for U.S. Appl. No. 11/239,731, mailed Sep. 25, 2013.
Official Action for U.S. Appl. No. 11/239,731, mailed Dec. 19, 2011 17 pages.
Official Action for U.S. Appl. No. 11/239,731, mailed Jun. 11, 2012 20 pages.
Official Action for U.S. Appl. No. 14/147,969 mailed Dec. 3, 2014.

* cited by examiner

SECURE SYSTEM AND METHOD TO PAY FOR A SERVICE PROVIDED AT A RESERVATION

CROSS-REFERENCE TO RELATED APPLICATION

The present application is a continuation-in-part of application Ser. No. 11/239,731 filed on Sep. 29, 2005, now U.S. Pat. No. 8,622,292, and entitled "Reservation-Based Preauthorization Payment System." Applicant hereby claims the benefit of that earlier application to the extent permitted by law and incorporates by reference the entirety herein.

FIELD OF THE INVENTION

The present invention generally relates to an integrated reservation, secure payment and information management system. The overall system allows a customer to make a reservation and make arrangements to securely pay for services to be provided at the reservation. The management component of the system generally allows a vendor, through the reservation system, to manage reservations and payments for services provided at a reservation. The reservation and secure payment information are preferably stored upon the reservation system and provided to the management system, such as a vendor's point-of-sale ("POS") systems, upon direction or as otherwise automatically programmed into the overall system. The overall system is designed to provide a richer and safer on-line/off-line experience to both the customer and to the service provider.

BACKGROUND OF THE INVENTION

Reservations to purchase services or products are customarily either made in person, by phone or through use of an on-line reservation system. It is to be understood that "service" is used throughout this specification as including both services and products to be purchased in the future, and should be so understood by a person of skill in the art.

FIG. 1 is a block diagram showing the basic principles of prior art reservation systems. The figure generally describes a customer 20 contacting a network, such as a phone or computer network 22, to make a reservation with a particular service provider 24. Using the system, the customer 20 selects a date and time for her reservation, submitting her request to the reservation system 22. Once the information is received by the reservation system 22, the reservation is verified, often against the reservation system's electronic database of available times and days for particular services. If the date or time is not available, the customer 20 is prompted by the reservation system 22 to select another date or time. If the date and time are available, the reservation system 22 reserves the reservation in known fashion.

On the day and time of the reservation, the customer will often travel to the service provider 24, requesting and then receiving reserved and/or other services. The customer next often receives a bill for services provided, paying the bill by the tender of cash, check or credit card. Often, the customer then waits for the transaction to be completed by the receipt of change or authorization/verification of the check or that the credit account has sufficient credit to cover incurred charges.

When credit is used as a payment method, the typical credit authorization process limits the speed at which the transaction can take place. For instance, typically a customer receives a bill for services rendered. The customer, after reviewing the bill, must then often attract the attention of the service provider to hand a credit device, such as a card, to the service provider, who then must obtain an authorization from any one of several known credit authorizing systems. It is not uncommon for this total process to take in excess of several minutes. To obtain that authorization, a vendor normally runs the credit device and/or other account information through its POS or other type of known verifying system. Some examples of known POS systems are Micros, Aloha and Maitre'd. The process, while sometimes only taking seconds, can take much more time.

Once authorization has been achieved, a bill is provided to the customer, who then may add a gratuity and/or sign the receipt. Once that has occurred, the customer is generally free to leave. Once the customer has left, however, the vendor still often must enter an included gratuity, utilizing more of both the vendor's and the credit card authorization system's time and assets. Obviously, the prior art process is cumbersome to both the customer and provider.

The security of credit account information, identification information and perhaps other information is also always at issue in the traditional service provider-customer credit payment transaction process. The traditional transaction model usually requires payment by the use of an actual card or other instrument. Under this transaction model, the customer's credit card and, often times, some form of personal identification (such as a driver's license) leaves the possession of the customer at the time authorization is performed. Unscrupulous third-parties (including service provider staff, other customers, etc.) may then have access to the customer's credit account and personal identification information. With that access, it is possible for the third party to perpetrate any number of forms of identity theft and/or other fraud upon the customer.

Also, under the traditional service provider-customer credit account transaction model, customers typically only become aware that their credit line has been or is about to be exceeded after a failed attempt for authorization occurs. For a customer, it may be embarrassing to find out that a proposed credit charge has been denied. A denied credit request also may be frustrating and worrisome to the service provider, who may question whether the customer will be able to ultimately tender payment for services rendered.

SUMMARY OF THE INVENTION

The present invention addresses these and other issues raised by known systems. For instance, under an exemplary embodiment of the inventive system, a customer may be informed prior to obtaining services from the service provider as to whether or not their chosen credit account has a sufficient credit line for the services to be provided. Also, under the exemplary system, the service provider is never provided with the customer's account information. Rather, all the service provider receives is preauthorization or payment code information—payment account information remains securely stored within the reservation system. Also, by preauthorizing payment for services to be provided, the overall payment process will be streamlined, potentially eliminating the entire at-the-provider authorization step, saving both the vendor and customer time and effort.

One exemplary embodiment of the present invention has several aspects and includes an integrated reservation, payment and vendor information management system. The system allows a customer to make reservations with a service provider and to provide that service provider with information concerning a method of payment to satisfy a bill for services to be purchased, with that information preferably being stored in the reservation system and provided to the service provider's management device, such as a POS, only as designed or needed. A method of payment could concern credit issued on any account known to the system and for a dollar amount which could be ascertained in any number of fashions. When a customer arrives at a service provider, the system, typically through a POS or similar device, will alert the service provider that the customer has a payment on file. With that information, payment of the final bill should be facilitated. Facilitation could include the automatic printing of a final bill with payment on file information, tip line, comment line, etc., and signature line already included thereon.

Typically, a customer may access a reservation system in a number of fashions. A customer may call a service provider directly; a customer may place a telephone call to a reservation clearing house; a customer may access an internet/www based reservation system; etc. The concepts of the present system will work with any of these and other types of reservation systems. Nevertheless, the system will be described in connection with a customer accessing a computer network-based reservation system.

Upon accessing the reservation system, a customer can register to become an authorized system user. During the registration process, general personal information, such as name and contact information may be gathered. The customer can preferably view a list of subscribing service providers, such as restaurants, automotive repair shops, health clubs, personal hygiene professionals, etc., and the menu of services each provides. If desired and registered, the customer can next attempt to make a reservation to purchase an offered service, requesting a date and time to have that service provided and/or other requests, such as specific seat and table preferences, etc.

(a) The Preauthorization Model

At the time the reservation is made, the customer may preferably next be prompted to select a credit account payment option. If the customer does not choose that option or if such an option is unavailable from the selected provider or to the customer, the reservation will simply be completed. Should the preauthorized credit account payment option be chosen, however, the customer will be prompted to make additional selections.

At this point, the customer preferably has several options to potentially pursue. If a returning customer, the customer may select from a menu or other similar device a credit account previously registered with the system and which the customer wishes to utilize for the then under-consideration transaction. A second option preferably available to the customer is to supply the system with information concerning a new or different preexisting credit account. If a customer chooses to use a preexisting credit account, the customer is prompted to provide required identification information into the reservation system. The system will then perform appropriate verification of the information.

If there is sufficient credit on a selected account, a preauthorization is awarded, and the reservation information being supplied to and stored as a functional unit usually by the reservation system. The customer and perhaps the service provider may also be provided the preauthorization and reservation information for its records.

A third option available to a customer is to apply for instant or other credit through the system.

Instant credit processing systems are known and the following are incorporated herein by reference in their entirety: U.S. Pat. Nos. 6,887,656, 7,131,583, and 7,302,719.

In the instant credit situation, the customer is prompted to complete a credit application. The system then conducts a credit check and/or performs other known operations. The credit issuing system, which may be part of the overall reservation system or a stand-alone system, will approve or deny the customer's request for credit based upon any number of prerequisites and system settings, as are generally known in the industry. If the customer's credit application is denied, the customer is so notified and may still request preauthorization with use of a preexisting credit account or request a non-credit preauthorization reservation. If new credit is approved, the customer is notified of the credit limit for the new account and a credit authorization and other information is sent to the reservation system, as generally described above. The system may also provide the customer with new account information and/or devices, such as an account number or credit card, which could be used to pay for purchases made outside of the overall system. Once issued by the system, a customer is free to make reservations and have credit authorizations issued to selected service providers operating within the system, up to the customer's authorized credit limit on any given account.

The dollar amount of credit that may be preauthorized is dependent upon a number of factors. First, a preauthorized dollar amount could be requested by the customer and/or service provider. Additionally, for customers that have sufficiently high credit ratings, the system could preferably authorize any amount actually charged during the reservation, up to predetermined security ceilings. The system could also calculate a dollar amount to be preauthorized utilizing reservation information and/or perhaps other metrics. For instance, a service provider may track the average cost of services typically rendered. That figure may be stored within the overall system and may be used to calculate the amount of preauthorized credit to be awarded any customer who makes a reservation at that or similar service providers. Other metrics may also be utilized, as will be understood by those skilled in the art. How much credit shall be preauthorized and how that figure is arrived at is a dynamic that will be left to and is well within the skill of those working in this art. Suffice it to say, however, that the amount of credit which will be preauthorized through the system will be dictated by customer preferences, member service provider preferences, reservation information or some combination thereof, in addition to other metrics or input data that may be used to determine the amount of credit to be preauthorized.

With reference now to a customer receiving reserved services, at an appointed time and day, the customer may arrive at the service provider and identify him/herself as the customer having previously made a reservation. Unique customer information (i.e., a code, biometric, call back, etc.) may next be provided to the vendor, perhaps by entering data provided by the customer into the provider's management system. That system may preferably be programmed to then query the reservation system and/or an associated database to determine if in fact the customer has a reservation and if that customer has received preauthorization to pay for services to be provided with credit. Retrieved information is generally forwarded back to the vendor's management system for use during the then-to-be-concluded transaction.

Next, the customer orders and receives requested services. The customer finally requests a bill for services rendered. The service provider finalizes the service request, usually on its POS system. That system recognizes the customer's transaction as a pre-authorized credit payment and issues a specialized bill for services rendered. The customer signs the special receipt, having the option to leave an additional tip, and leaves the service provider. The service provider completes the transaction by submitting the final customer-authorized total payment and perhaps other desired information to the reservation system. That system will then preferably send required information to an associated credit acquisition or other similar system for payment.

Yet another aspect of the present invention allows for the payment of services by a third-party to the transaction. For example, a party may register on the system, make a reservation, and request credit for services to be provided to another. This aspect of the invention may be most attractive to parents making reservations for and paying for services or products to be consumed by a child.

An exemplary embodiment of the present invention can be used in conjunction with all service providers that take reservations. For example, the present invention can be used with restaurant services to provide a system of making reservations and for preauthorization of credit to be used to pay for services reserved. In practice, a customer may access the integrated reservation system to select a participating restaurant and to make a reservation. The customer is then given the same options as described above: continue with just a reservation or make a reservation in conjunction with preauthorizing a credit payment for services reserved and to be purchased. On the date of the reservation, the customer travels to the restaurant and identifies him/herself as having a reservation. Upon verification of that reservation, the customer is seated and orders a meal. After the meal, the customer requests the bill. The restaurant's management or other system recognizes the customer as pre-authorized for credit and generates a unique check for the customer to sign. The customer then receives the check and has the option to add a tip. The customer next signs the bill and then leaves the restaurant. The restaurant enters, either manually or automatically, the final total of the bill and perhaps other information into its management system, which can transmit data to the reservation system, credit acquirer and/or other appropriate systems. The reservation system, credit acquirer or other system transmits payment to the restaurant and bills the customer for that service payment. The entire payment process occurs without the service provider ever being privy to the customer's credit account information and without the need of the customer providing the restaurant with a credit card or similar device.

(b) The Secure Payment Model

In accordance with another novel exemplary embodiment, a payment on file type of configuration is utilized to facilitate purchases.

More particularly, a payment to be used for a purchase is stored. This payment can include a certain pre-authorized limit and include one or more identifiers that identify the goods/services and/or vendor the purchase will be made with. For example, a customer arrives at a vendor and is identified as having a payment on file, and optionally a reservation as well. The arrival at the vendor can optionally be triggered based, for example, on a detected presence (using known technology) of the customer, such as the customer's PDA or cell phone, with identity information and reservation information also optionally being forwarded to the vendor. The vendor can create a customer ticket and correlate the ticket to the customer profile.

In accordance with one exemplary embodiment, the customer ticket information is on the point of sale and services/goods are recorded or otherwise provided on the ticket. For example, in accordance with yet another exemplary embodiment, a remote reservation system is contacted for ticket creation or alternatively still, the customer supplies some of the ticket information.

During check-out, three scenarios can occur. The first is an express check-out option, the second is a self check-out or check-in with, for example, a mobile device and the third scenario occurs when payment is rejected.

For express check-out, the point of sale can confirm the ticket is complete. For example, by querying a database of the reservation system, securing information about the payment on file, and applying any applicable coupons, gift cards, etc., and applying the same to the ticket. The ticket can then be confirmed by the customer and printed. Once confirmed, the customer can complete the ticket, through applying their signature, and is able to leave the vendor with the purchased goods and/or services. The vendor then inputs the completed ticket information into the point of sale system, altering, for example, the amount to be paid if a tip has been added.

For the second scenario, a mobile device can send instructions to the vendor point of sale requesting a ticket be sent to the device. The point of sale can confirm the ticket is complete, for example, by querying the database as described above and applying coupons, discount codes, gift cards, and the like, to determine a total amount due. Once complete, the confirmed and completed ticket can be sent to the customer's device where the customer has the option of adding gratuity, confirming ticket accuracy, and authorizing payment from the payment on file account and the confirmed and completed ticket being returned, for example, wirelessly, to the point of sale. If the mobile device has such capabilities, an electronic signature can also be captured on the mobile device and forwarded with the confirmed and completed ticket back to the point of sale.

For both scenarios one and two, the point of sale then sends the information to the database/reservation system indicating the goods and/or services provided, the total to be paid, and requesting payment from the payment on file. The service provider typically then advises that the transaction is complete and optionally provides the POS, or vendor, with an authorization code. Then, the database and/or reservation system processes the POS request, debiting the customer account and crediting the vendor account, and sending notice of the same to the POS and one or more other designated systems.

In the third scenario, where payment is rejected, a customer can optionally complete payment for the goods or services in a traditional manner, e.g. cash, check, credit card, or the like.

On the reservation side of the system, a customer queries a reservation system looking for a placed reservation. This could be based on, for example, one or more of name, loyalty rewards program number, social security number, address information, e-mail information, or in general only information that allows the customer to identify a placed reservation. Once the reservation is found, a query is performed to locate alternative payment methods to which the customer already subscribes. These alternative payment methods can be, for example, any e-commerce business model that allows payments and money transfers to be made through the Internet. One example of such service is PayPal® as well as E-Cash, the Ripple Monitory System, PayMate, and Google Check-Out.

If an alternative payment method is found, the customer can confirm their reservation and be provided with an interface that allows a payment on file to be created. For example, the necessary information can be requested from the customer such that the reservation system is able to access the payment on file account, such as the last four digits of the social security number (SSN), login information, billing information, or the like. With this information, the reservation system is able to communicate with the payment on file system to approve the transaction.

Once the transaction is approved, the customer can be provided with confirmation of the reservation via confirmation, such as an e-mail, SMS message, voice message, or the like, and also be provided with instructions on how to alert the service provided to the payment on file, and optionally any other pertinent information. The customer can also add coupons, loyalty program numbers, preferences, cell phone number, address information, shipping information, payment record, or any other relevant information as needed. This information then can be collected and added to the reservation.

On the back-end, a unique payment on file code is generated and stored in conjunction with the reservation. The payment on file information can include code information at the database, such as the reservation system database. Next, the vendor's point of sale system is informed of the reservation, that there is a payment on file for goods and/or services to be provided, and any other necessary data to complete the transaction, such as code information. Some or all of the above information can be sent to the point of sale, or only a portion sent to the point of sale with the point of sale accessing needed information from the database.

While the secure payment model can be used with the previously discussed preauthorization model, that need not be the case. Rather, both models can work independently, together or aspects of each could be combined as desired by a skilled artisan.

The exemplary embodiments of the present invention can provide a number of advantages depending on the particular configuration. These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like.

While circuit or packet-switched types of communications can be used with the present invention, the concepts and techniques disclosed herein are applicable to other communications types, protocols and communications techniques.

Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of embodiments of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

Figure 1:
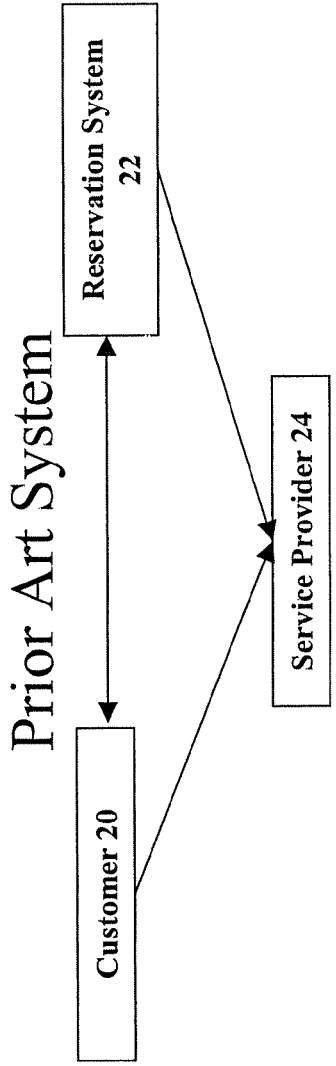
FIG. 1 is a block diagram of prior art reservation systems.

It should be understood that the drawings are not necessarily to scale. In certain instances, details which are not necessary for an understanding of the invention or which render other details difficult to perceive may have been omitted. It should be understood, of course, that the invention is not necessarily limited to the particular embodiments illustrated in the drawings.

DESCRIPTION OF THE PREFERRED EMBODIMENTS

The invention will be described below in relation to a computing environment, and in particular a sale transaction environment. Although well suited for use with POS and mobile computing devices, the invention is not limited to use with any particular type of device or configuration of system elements and those skilled in the art will recognize that the disclosed techniques may be used in any environment in which it is desirable to provide context-based changes to operation. The various techniques described herein can be used with any device such as a telephone, speakerphone, cellular phone, SIP-enabled endpoint, softphone, PDA, POS, wired or wireless communication device, PC, desktop computer, laptop, or in general any device(s) that is capable of supporting a sales transaction.

The exemplary systems and methods of this invention will also be described in relation to software, modules, and associated hardware and network(s). In order to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated however, that the present invention may be practiced in a variety of ways beyond the specific details set forth herein.

Figure 2:
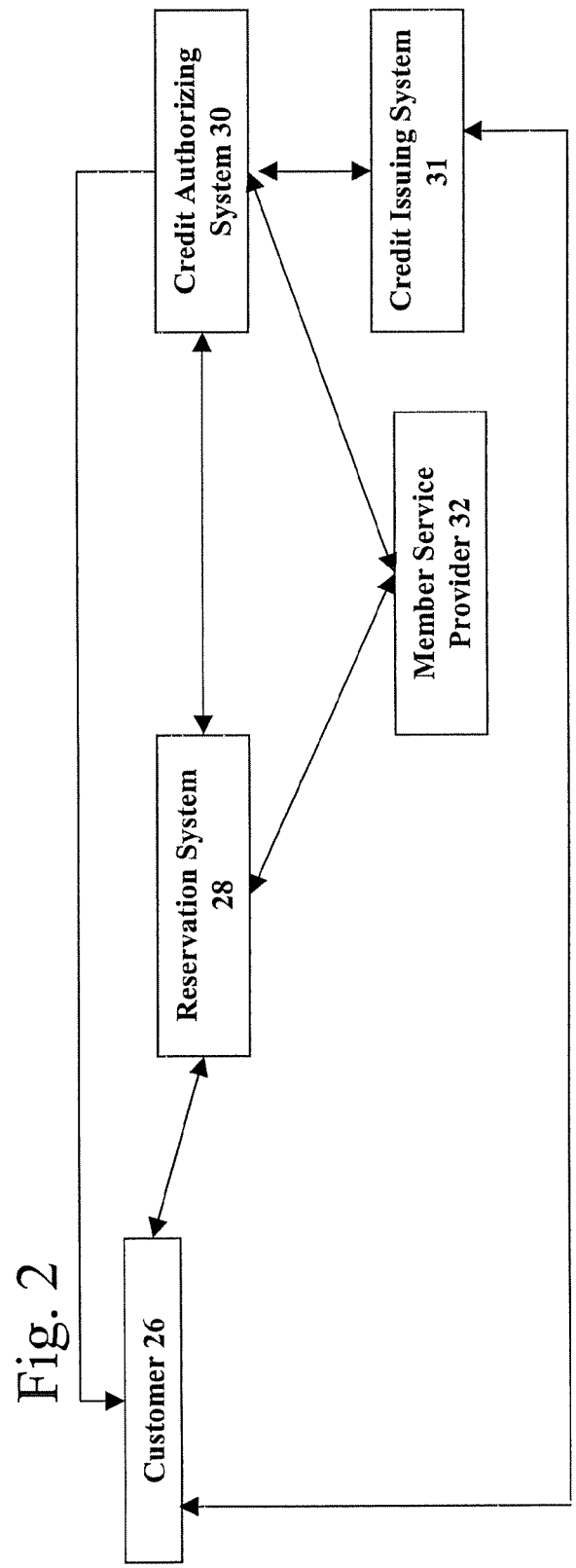
FIG. 2 is a block diagram of a system according to one aspect of the present invention.

FIG. 2 is a block diagram showing some of the principles of an exemplary integrated reservation and preauthorized credit method and management system. Customer 26 preferably first accesses a reservation system 28. The reservation system 28, whether phone, Internet or other network based system, first prompts an existing system customer 26 to enter identification information or prompts a new customer 26 to register as a new user on the reservation system 28. In the latter scenario, the reservation system 28 will request a series of input from customer 26, which may include personal identification information (e.g., name, address, phone number, e-mail address, etc.), the selection of a unique personal identification code or name (e.g., username), and a password or other personal identification information, such as a call back number, a voice recognition print or other biometric information, caller identification information, etc.

Once registered, the reservation system 28 will usually next prompt the customer 26 to select a desired service provider and enter reservation information (e.g., location, date, time, services desired, etc.). Once a reservation is selected and verified as available, the system usually moves to a credit preauthorization processing step.

The reservation system 28 preferably next prompts the customer to pay for services to be provided at an available reservation through a preauthorized credit option. If the customer selects that option, the customer is asked to either apply for credit through the system (process described above) 31, to select a preexisting credit account already registered with the system or to enter information concerning a preexisting credit account into the system. Once an account is selected, the system checks to determine that account has a sufficient available credit limit. If so, preauthorization of at least some credit is granted. Next, preauthorization information, along with the reservation information, is preferably provided to the reservation system. In another embodiment of the invention, that same information could simultaneously be provided to member service provider 32 and/or customer 26. In yet another embodiment of the invention, the reservation and preauthorization information could be provided first to member service provider 32, and then, perhaps, subsequently to the reservation system 28 and customer 26. If preauthorization is denied, only the customer is notified, who may attempt to receive preauthorization through another credit account or simply have the reservation, without preauthorization of credit, sent to the reservation system 28 and/or member service provider 32.

As explained, the customer 26 can also apply for and receive a new line of credit through the system. If the customer 26 applies for new credit, the credit authorizing system 30 will typically communicate with a credit issuing system 31. In this situation, first a credit application must typically be completed by the customer 26. The credit issuing system 31, using that customer information and other available information, next determines whether to issue new credit, and can communicate approval or rejection of the credit application to customer 26 directly, through the credit authorizing system 30 or through the reservation system 28 or any combination thereof. If the credit application is denied, the reservation system 28 typically shall store only reservation information and shall only supply that information to member service provider 32. The reservation system will provide confirmation of the reservation or a request to select a new reservation, if a conflict exists, to customer 26.

It will be understood by those skilled in the art that the reservation system 28, credit authorizing system 30 and credit issuing system 31 could all be part of a single system, may be separate systems, or may simply be integrated or unintegrated components of much larger overall systems. The actual configurations of systems which perform the disclosed functions do not and should not be considered to limit the scope of the present invention.

If customer 26 selects the pre-authorized credit option and credit is approved, credit information, such as an authorization for a pre-selected amount, is sent from the credit authorizing system 30 to the reservation system 28 and/or member service provider 32. The reservation system 28 and/or member service provider 32 may receive the preauthorization and other information in any number of ways. Typically, such information will be received with the reservation information. Those pieces of information then can be stored for later retrieval and use. The preauthorization and reservation information may be received as a functional unit and may be stored as a functional unit, but that need not be the case. Most preferably, the information is received by and stored upon a management device, such as a service provider's POS system.

Figure 5:
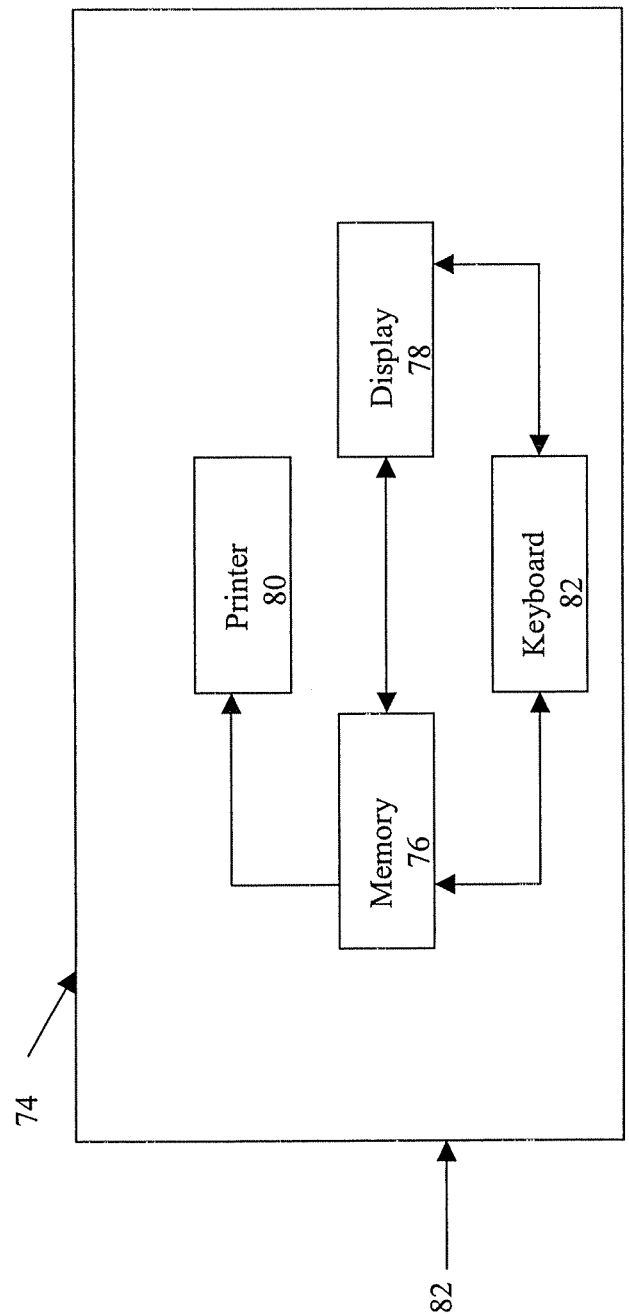
FIG. 5 is a schematic diagram showing some componentry of the preferred reservation and preauthorization information receipt and storage device of the present invention.

As will be understood by those skilled in the art and with reference to FIG. 5, the management device 74 includes a memory 76, preferably having random access capabilities, and a display 78, preferably a viewing screen of known configuration. The management device 74 also may have a printing device 80 of known configuration and functionality. Management device 74 also preferably includes a device which allows the service provider to input information into the device, such as a keyboard 82 or other known device. The management device 74 is in communication, via a network connection 82, with reservation system 28 and/or credit authorizing system 30 and/or credit issuing system 31 and/or credit acquisition system (not shown). Information received through network connection 82 can be stored upon memory 76, displayed upon display 78 and printed upon medium provided as part of printer 80. Preferably, device 74 stores received preauthorization, reservation and other desired information in memory 76 as a functional unit, i.e., logically related. It will be understood by those skilled in the art that, though shown as a single unit, management device 74 may, instead, be comprised of many separate functional components, all of which taken together are configured to create the management device 74. Further, combinations of several but not all devices into a single package very well could occur and is to be understood as being within the scope of the present invention.

With specific reference to FIG. 6, an exemplary embodiment of the overall architecture of a preferred system, at least parts of which have already been described, will now be discussed. As will be understood by those skilled in the art, a basic component of the overall system is the reservation system 100. That system can either include or can otherwise seamlessly communicate with a database 102, preauthorization system 104, vendors 106, 107, 108, customers 110, 112, 114, and either directly (not shown) or indirectly, credit acquisition 116 and credit issuing system 118.

As has been explained and as will be understood by those skilled in the art, any number of customers 110, 112, 114 can simultaneously communicate with the reservation system 100 through any number of communication protocols. The reservation system 100 can likewise communicate with the database 102 and, either through the database or directly, the preauthorization system 104 and the credit issuing system 118. Preauthorization system 104 and credit issuing system 118 can also communicate directly, in another of the preferred embodiments, with customers 110, 112 and 114. Such communication may or may not be necessary, depending upon specific implementation of the system. As will be understood by those skilled in the art, customers 110, 112, 114 can communicate with the reservation system 100 as needed to make, review, update, modify, cancel or otherwise change reservations. The reservation system 100 can also communicate on an as-needed basis with customer 110, 112, 114, individually, as a group comprised of less than all customers, or a group comprised of all customers and/or others, depending upon any particular application or communication need.

The reservation system 100 also may communicate with credit acquisition system 116, either directly (not shown) or indirectly through the database 102. Credit acquisition system 116 may also communicate directly or indirectly with customers 110, 112 and 114, on an as-needed basis.

Reservation system 100 also preferably may have a constant line of communication with all vendors 106, 107 and 108 participating in the system. Vendors, 106, 107 and 108 may also bypass certain portions of the reservation system 100 and communicate directly with database 102 (not shown), preauthorization system 104 (not shown) and credit issuing system 118 (not shown). Vendors 106, 107 and 108 may also, as necessary, communicate with credit acquisition system 116 directly or indirectly through the reservation system 100.

Figure 6:
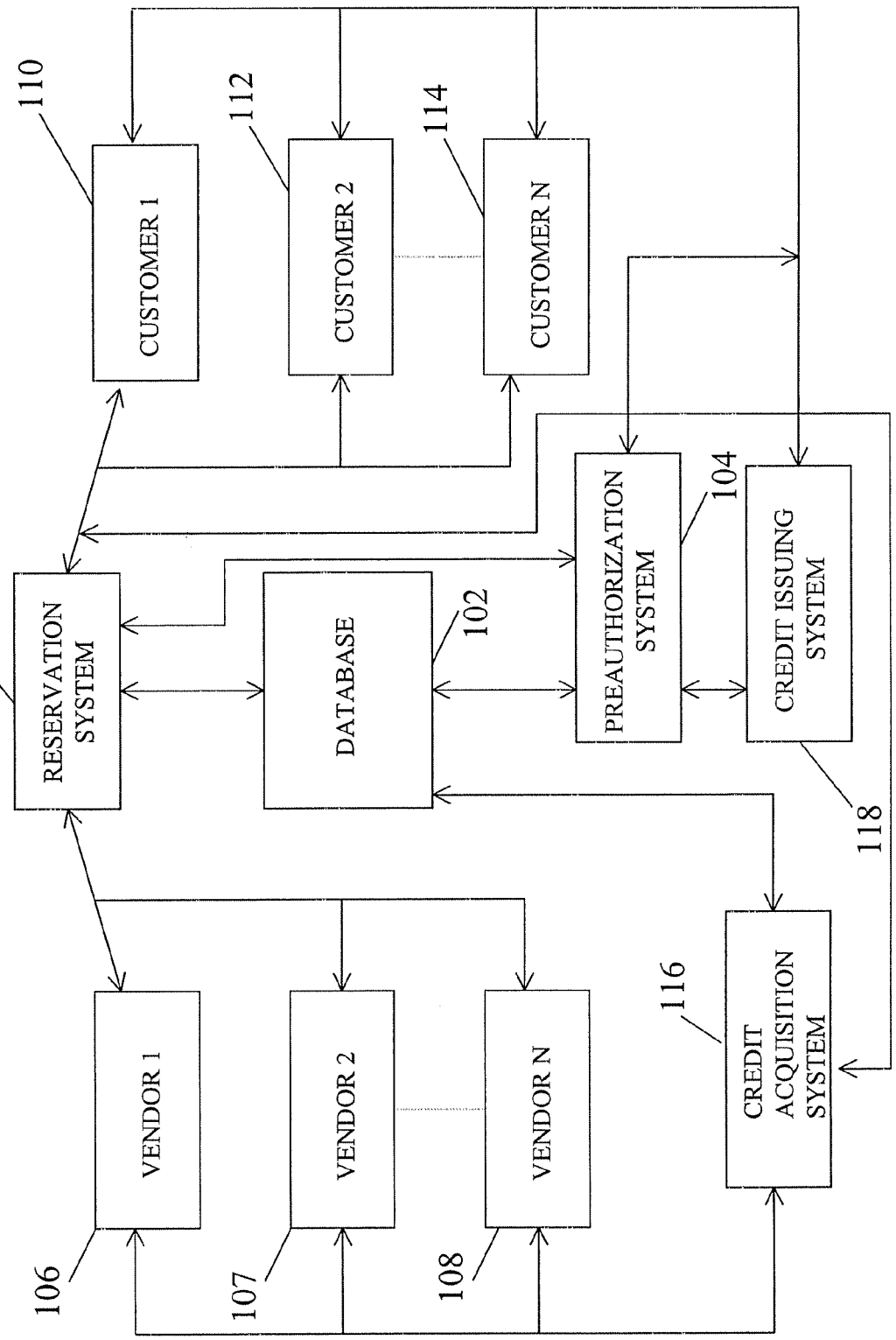
FIG. 6 is a schematic diagram of the overall architecture of a preferred embodiment of the present invention.

As will be understood by those skilled in the art, the overall preferred architecture set forth in FIG. 6 is provided simply for illustrative purposes and could have any number of communication scenarios. Further, it is to be understood that the system can accommodate virtually any number of customers and any number of vendors. Further, one of skill in the art would understand that, within the reservation system and/or within an associated database, information would be stored in a logical manner which would facilitate retrieval by an individual, customer, vendor or others. Such could be accomplished through any number of known data structures, memory partitioning systems or in other ways known in the field.

Figure 3:
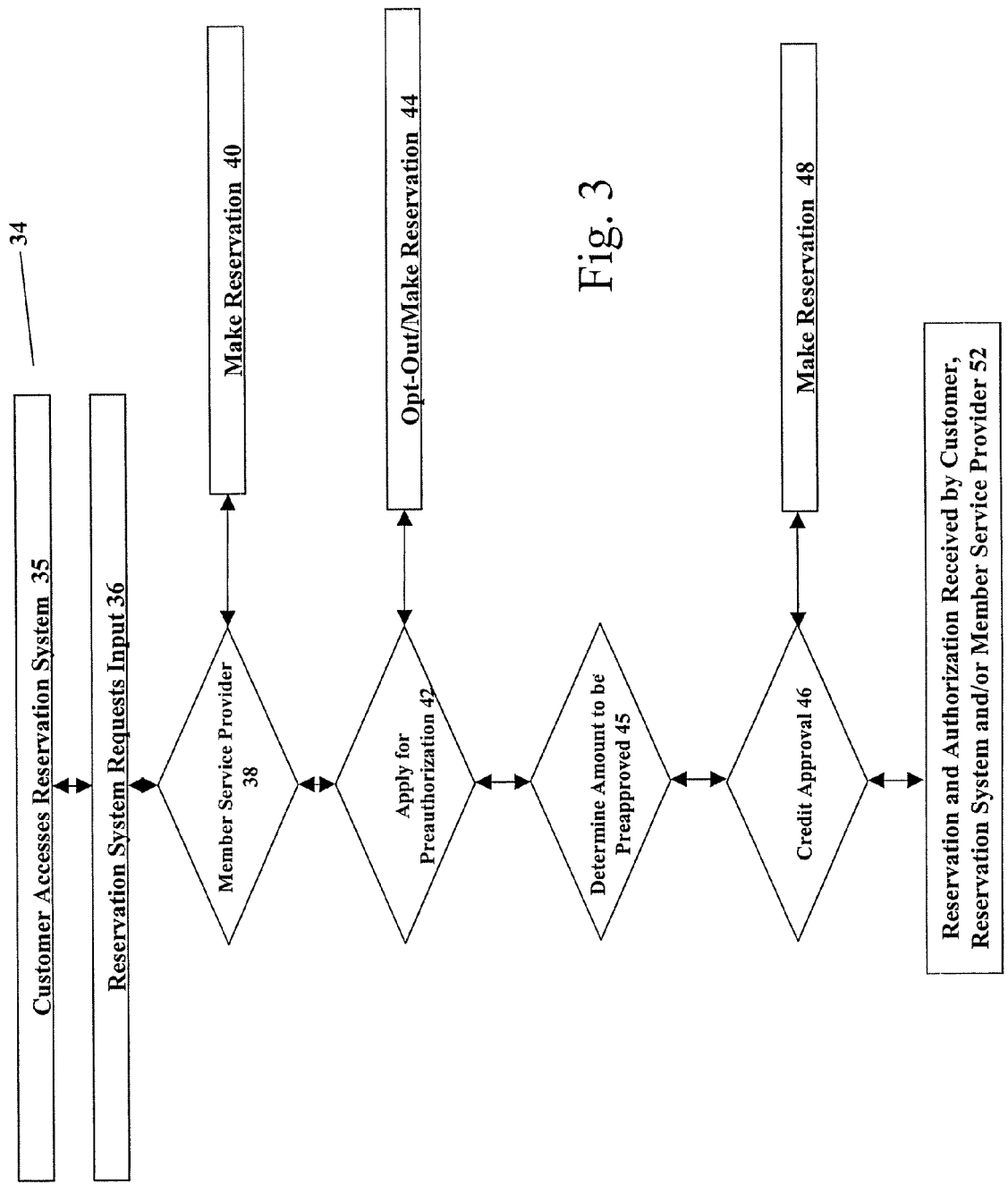
FIG. 3 is a flowchart illustrating a reservation and credit issuing system according to another aspect of the present invention.

FIG. 3 is a flowchart illustrating the function of a preferred integrated reservation and credit authorizing system. Customer accesses the system in one of several typical and known ways in the art 35. The system requests input 36 from the customer. If the customer is a new user, the system will prompt the customer to register on the system, requiring the customer to input contact information. Once recognized, the system will prompt the customer to enter reservation information. The system 34 will then determine whether the requested service provider is a member of the credit authorizing system 38. If not, the process of making the reservation is completed 40, i.e., the reservation is confirmed and information regarding the reservation is sent to the customer, reservation system and service provider. If the requested service provider is a member of the credit authorizing system, the customer is prompted to use preauthorized credit to pay for service(s) to be received at the reservation. If the customer does not select the preauthorized credit option, the customer may opt-out and complete the reservation 44. If the customer chooses the preauthorized credit option, the customer will be prompted to provide credit account information 42. Next, the system must determine the amount of credit to be approved 45. The system can determine this amount based upon any number of metrics, as discussed above.

If preauthorization is denied, the customer is notified and is prompted to either supply different credit account information to attempt to achieve preauthorization or more simply complete her reservation 48. If credit is approved, the preapproval and reservation information will typically be sent to the customer, the reservation system and, perhaps, the member service provider 52.

In another preferred embodiment of the reservation system (not shown), the ability to store meal logs for taxation or other archival purposes may be provided. In this embodiment, customers will be prompted by the reservation system, usually while making a reservation, but perhaps thereafter as well, to state whether the reservation will be for tax-deductible or other purposes. Other descriptive information could also be added to the reservation record. If information is to be added, the customer will be prompted to provide such information. The overall system will maintain a log and provide reporting as to completed reservations, providing inputted and desired information to customers, companies and/or selected other entities. The described functionality will eliminate the need for customer, company or other tracking entity to keep a separate log of fees expended on events purchased through the reservation system, e.g., tax-deductible services, etc. Once again, this functionality will lead to a richer value-added customer experience.

While the system has been described as having a reservation made first and a request for credit and/or preauthorization occurring second, one working in the art will realize that many of the above described steps can and often will be performed in different and varied orders, with no impact upon overall feasibility of the preferred process.

Figure 4:
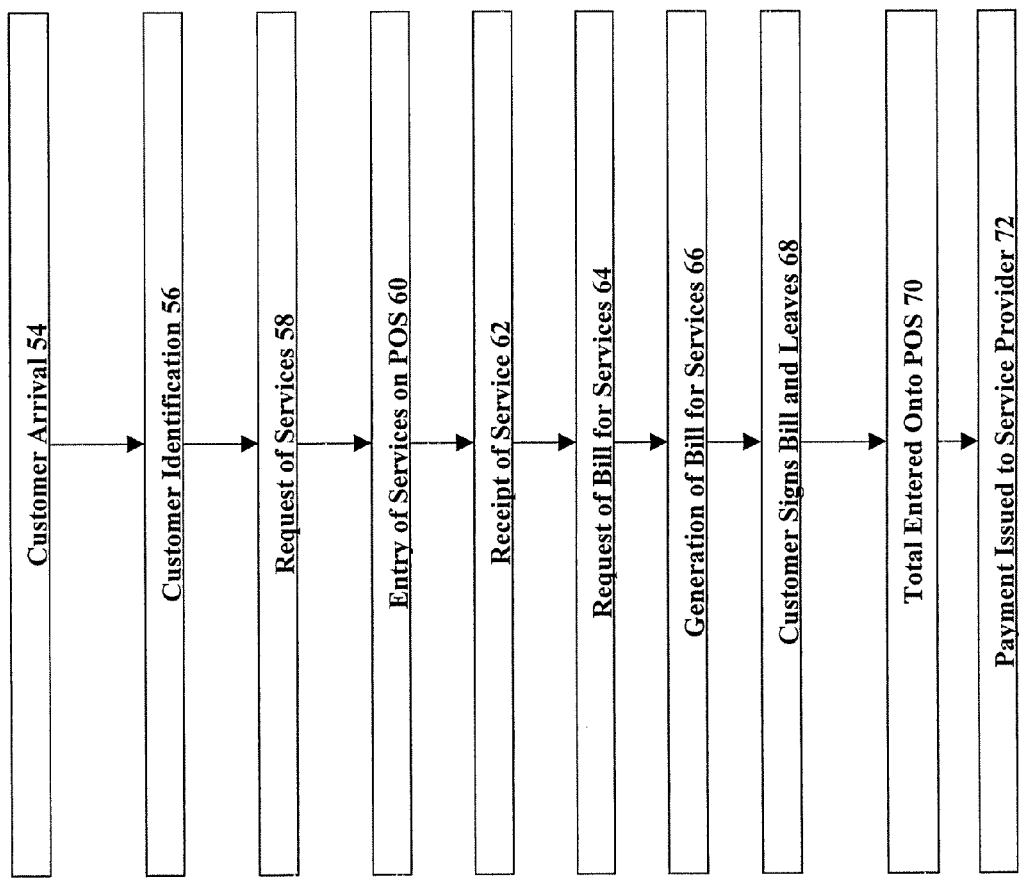
FIG. 4 is a flowchart illustrating payment to a service provider according to another aspect of the present invention.

FIG. 4 illustrates a preferred flow process of the preferred invention once the customer has arrived at a member service provider. Once at a service provider location 54, the customer identifies herself (using traditional or non-traditional forms of identification) as a customer with a reservation 56, requesting provision of reserved and/or additional services 58. The service provider enters a customer's service request into its management system, such as a POS system 60, which will preferably query the integrated reservation system for necessary information and verification. In this example, the customer has chosen to use preauthorized credit and the overall system alerts the provider to this fact so that payment for services to be rendered will occur as anticipated by the customer. The customer next receives requested and perhaps additional services 62. The customer then requests a bill for services provided 64. The provider's system generates a special bill that indicates payment has been preauthorized with a designated credit account 66. The special bill may provide for signature of the customer, the addition of a gratuity, etc. The customer usually will sign the special bill, perhaps leaves a gratuity, and exits the service provider 68. The final bill total and other desired information is entered by the service provider onto its system 70. Payment is issued to service provider 72 in a traditional manner and as is well known in the trade 72.

The invention may also be used as a marketing tool for services providers or others. Marketing programs could include e-mail marketing, customer profiling, referral marketing, multi-channel marketing and gift and loyalty programs. Through the described system, an efficient method of identifying, tracking customer recentness, frequency and amount of money spent, as well as categorizing customers and their preferences, can be provided, as will be understood by one of skill in the art. Through the described system, one could also market differently to each category of customers and reward customers for their desired behaviors, as will be understood by those skilled in the art.

For instance, member service providers may provide advertising or incentive programs to be used in conjunction with the overall system. Advertising by an interested service provider may be placed as in-line text, banner, pop-up window advertising and/or other electronic means onto a graphical user interface connecting to the system. As will be understood by those skilled in the art, the system could also be designed to create and send marketing campaigns on behalf of participating service providers or others.

Another such campaign could be the marketing of special events for a service provider. The recipient of e-mail concerning such an event could simply respond to the marketing material, automatically creating a reservation for that event. Events that might be the subject of such marketing campaigns could be e-birthday cards, e-holiday cards, discount coupon advertisements, etc.

Preferably, the reservation system will also enable customers to easily invite others, such as friends or co-workers to planned events which have been reserved through the system. For instance, customers could be able to select a service provider from the system's on-line database and make a reservation. The customer then could create a list of invitees with corresponding e-mail addresses, each of which would be saved by the system. The system would then generate invitations to the reserved event, sending those invitations to each of the invitees set forth on the customer's list. Invitees could then simply respond to their invitation to RSVP for the event. Preferably, once the customer's deadline for the RSVP has passed, the overall reservation will be set in the system, with the service provider's management system being able to obtain necessary information as desired. Thereafter, confirmations could preferably be sent to invitees and the customer, with automatic updates, reminders and other similar electronic notifications being sent as desired, either by the service provider, reservation system, customer or all three. Obviously, once the invitees' contact information is added to the overall system, they too could be marketed to through the system as outlined above.

As should be understood, an interested service provider may also provide promotions, such as incentive/reward point systems and/or other service discounts through the reservation system. The reservation system could transmit such promotional information (e.g., discounts) to the member service provider to be applied to a bill for services to be rendered a given customer or in other ways customary in the trade. Preferably, such a system would be directly integrated with a dedicated management device.

The inventive system may also be used by the member service providers and/or other third parties to track customer purchasing trends, payment trends, etc. Such information can later be used for purposes of direct marketing, through electronic mail or otherwise and/or through sponsored advertising with related Internet links of related and/or competing service providers.

In another embodiment of the present invention, customers could receive frequent dining points to be tracked by the system by either registering an existing credit card with the reservation system and using it as a form of payment, or by making a reservation through the system. Either way, customers can receive points automatically and transparently when they purchase services from a participating service provider. A customer could obtain points by simply walking into a service provider and paying for services purchased with a registered credit card or other registered device. Upon joining a service provider's loyalty program, each time the customer frequents an establishment operating under the loyalty program, they could preferably receive an e-mail confirming the number of loyalty program points added to their account.

In another embodiment, a marketing campaign could be established to allow the purchase of gift cards or certificates. Optionally, this purchase could be charged on one of the accounts on file with the reservation system or with a newly established credit account. Through integration of the reservation system with service provider management systems, these gift values could be passed from the reservation system to the management system, similar to the preauthorization of credit, as a form of payment. The redemption of loyalty rewards can also be converted into a gift card or e-gift certificate and be used as a form of payment on-line or in-store.

In accordance with the second exemplary embodiment, payment on file type is utilized to facilitate purchases. Similar to the above embodiments, the architecture of FIG. 6 can be utilized to facilitate customer-vendor transactions. More particularly, a customer (110, 112, 114) arrives at a vendor (106, 107, 108) and is identified as having a payment on file stored in, for example, the database 102, and optionally a reservation as well managed by the reservation system 100.

The arrival at the vendor can optionally be detected based, for example, on a detected presence of the customer, such as the customer's PDA or cell phone, passing through a geo-fence, or the like, with identity information and reservation information also optionally being forwarded to the vendor. As will be appreciated, this could also be done automatically or semi-automatically with optional rules in place to protect sensitive customer information.

The vendor can create a customer ticket and correlate the ticket to the customer profile. In accordance with one exemplary embodiment, the customer ticket information is on the point of sale associated with the vendor and services/goods are recorded or otherwise provided on the ticket. For example, in accordance with one exemplary embodiment, the remote reservation system 100 is contacted for ticket creation or alternatively still, the customer supplies a portion of the ticket information.

During check-out at the point of sale, three scenarios can occur. The first is an express check-out option, the second is a self check-out or check-in with, for example, a mobile device, and the third scenario occurs when payment from one of the first two scenarios is rejected.

For express check-out, the point of sale can confirm the ticket is complete. For example, by querying a database for the reservation system and applying any applicable coupons, gift cards, etc., and applying the same to the ticket. The ticket can then be confirmed by the customer and printed. Once confirmed, the customer can complete the ticket, through applying their signature, and is able to leave the vendor with the purchased goods and/or services. The vendor then inputs the completed ticket information into the point of sale system, altering, for example, the amount to be paid if a tip has been added.

For the second scenario, a mobile device (not shown) can send instructions to the vendor point of sale requesting a ticket be sent to the device. The point of sale can confirm the ticket is complete, for example, by querying the database as described above and applying coupons, discount codes, gift cards, and the like, to determine a total amount due. Once complete, the confirmed and completed ticket can be sent to the customer's device where the customer has the option of adding gratuity, confirming ticket accuracy, and authorizing payment from the payment on file account and the confirmed and completed ticket being returned, for example, wirelessly, to the point of sale. If the mobile device has such capabilities, an electronic signature can also be captured on the mobile device and forwarded with the confirmed and completed ticket back to the point of sale.

For both scenarios one and two, the point of sale then sends the information to the database/reservation system (102/100) indicating the goods and/or services provided, the total to be paid, and requesting payment from the payment on file. The service provider typically then advises that the transaction is complete and optionally provides the POS, or vendor, with an authorization code. Then, the database and/or reservation system processes the POS request, debiting the customer account and crediting the vendor account, and sending notice of the same to the POS and one or more other designated systems.

In the third scenario, where payment is rejected, a customer can optionally complete payment for the goods or services in a traditional manner, e.g. cash, check, credit card, or the like.

On the reservation side of the system, a customer queries a reservation system 100 looking for a placed reservation. This could be based on, for example, one or more of name, loyalty rewards program number, social security number, address information, e-mail information, or in general only information that allows the customer to identify a placed reservation. Once the reservation is found, a query is performed to locate alternative payment methods to which the customer already subscribes. These alternative payment methods can be, for example, any e-commerce business model that allows payments and money transfers to be made through the Internet. One example of such service is PayPal® as well as E-Cash, the Ripple Monitory System, PayMate, and Google Check-Out.

If an alternative payment method is found, the customer can confirm their reservation and be provided with an interface (for example on a computer or mobile device) that allows a payment on file to be created. For example, the necessary information can be requested from the customer such that the reservation system is able to access the payment on file account, such as the last four digits of the social security number (SSN), login information, billing information, or the like. With this information, the reservation system is able to communicate with the payment on file system to approve the transaction.

Once the transaction is approved, the customer can be provided with confirmation of the reservation via confirmation, such as an e-mail, SMS message, voice message, or the like, and also be provided with instructions on how to alert the service provided to the payment on file, and optionally any other pertinent information. The customer can also add coupons, loyalty program numbers, preferences, cell phone number, address information, shipping information, payment record, or any other relevant information as needed. This information then can be collected and added to the reservation.

On the back-end, a unique payment on file code is generated and stored in database 102 in conjunction with the reservation. The payment on file information can include code information at the database, such as the reservation system database. Next, the vendor's point of sale system is informed of the reservation, that there is a payment on file for goods and/or services to be provided, and any other necessary data to complete the transaction, such as the code information. Some or all of the above information can be sent to the point of sale, or only a portion sent to the point of sale with the point of sale accessing needed information from the database.

Figure 7:
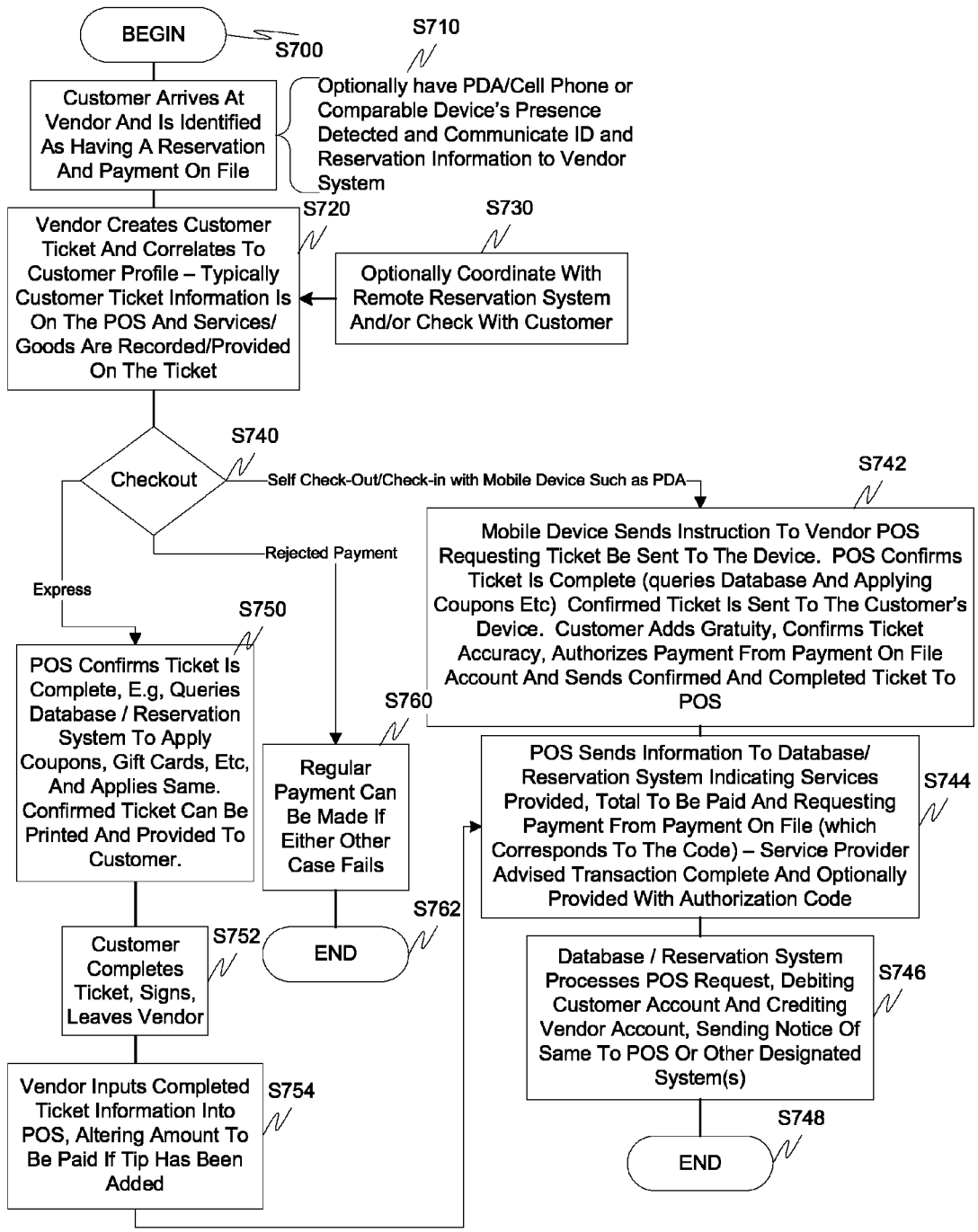
FIG. 7 is a flowchart illustrating an exemplary embodiment for payment on file according to this invention.

FIG. 7 outlines an exemplary method used for a payment on file type transaction. Control begins in step S700 and continues to step S710. In step S710, a customer arrives at a vendor and indicates a payment on file is stored in, for example, the database 102, and optionally a reservation as well managed by the reservation system.

The arrival at the vendor can optionally be detected based, for example, on a detected presence of the customer, such as the customer's PDA or cell phone, passing through a geo-fence, or the like, with identity information and reservation information also optionally being forwarded to the vendor. As will be appreciated, this could also be done automatically or semi-automatically with optional rules in place to protect sensitive customer information.

Next, in step S720, the vendor can create a customer ticket and correlate the ticket to the customer profile. In accordance with one exemplary embodiment, the customer ticket information is on the point of sale associated with the vendor and services/goods are recorded or otherwise provided on the ticket. For example, in accordance with one optional exemplary embodiment, in step S730, the remote reservation system is contacted for ticket creation or alternatively still, the customer supplies a portion of the ticket information.

During check-out at the point of sale, three scenarios can occur as indicated in step S740. The first is an express check-out option, where control jumps to step S750, the second is a self check-out or check-in, where control jumps to step S742, with, for example, a mobile device, and the third scenario, where control jump to step S760, occurs when payment from one of the first two scenarios is rejected.

For express check-out, and in step S750, the point of sale can confirm the ticket is complete, for example, by querying a database for the reservation system and applying any applicable coupons, gift cards, etc., and applying the same to the ticket. The ticket can then be confirmed by the customer and printed. Once confirmed, the customer can complete the ticket in step S752, through applying their signature, and is able to leave the vendor with the purchased goods and/or services. The vendor then inputs in step S754 the completed ticket information into the point of sale system, altering, for example, the amount to be paid if a tip has been added.

For the second scenario, in step S742, a mobile device (not shown) can send instructions to the vendor point of sale requesting a ticket be sent to the device. The point of sale can confirm the ticket is complete, for example, by querying the database as described above and applying coupons, discount codes, gift cards, and the like, to determine a total amount due. Once complete, the confirmed and completed ticket can be sent to the customer's device where the customer has the option of adding gratuity, confirming ticket accuracy, and authorizing payment from the payment on file account and the confirmed and completed ticket being returned, for example, wirelessly, to the point of sale. If the mobile device has such capabilities, an electronic signature can also be captured on the mobile device and forwarded with the confirmed and completed ticket back to the point of sale.

For both scenarios one and two, in step S744, the point of sale then sends the information to the database/reservation system indicating the goods and/or services provided, the total to be paid, and requesting payment from the payment on file. The service provider typically then advises that the transaction is complete and optionally provides the POS, or vendor, with an authorization code. Then, in step S746, the database and/or reservation system processes the POS request, debiting the customer account and crediting the vendor account, and sending notice of the same to the POS and one or more other designated systems. Control then continues to step S748 where the control sequence ends.

In the third scenario, in step S760, where payment is rejected, a customer can optionally complete payment for the goods or services in a traditional manner, e.g. cash, check, credit card, or the like. Control then continues to step S762 where the control sequence ends.

Figure 8:
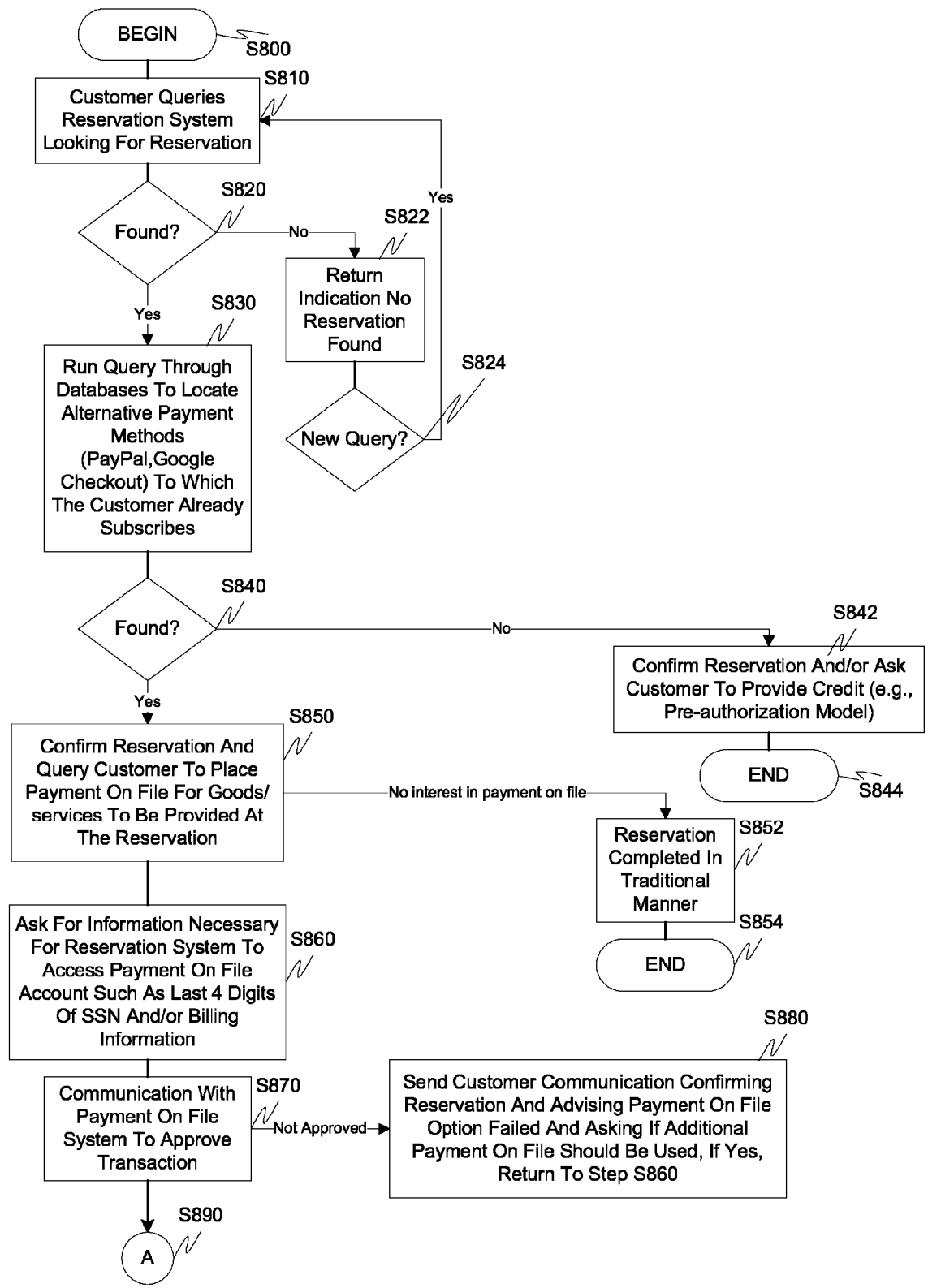
FIG. 8 is a flowchart illustrating a method for reservation management for payment on file according to this invention.

On the reservation side of the system, as illustrated in FIG. 8, control begins in step S800 and continues to step S810. In step S810, a customer queries a reservation system looking for a placed reservation. This could be based on, for example, one or more of name, loyalty rewards program number, social security number, address information, e-mail information, or in general only information that allows the customer to identify a placed reservation. In step S820, if a reservation is not found, control continues to step S822 where an indication of the same is displayed, with control jumping back to step S810 if another query is to be performed.

Once the reservation is found, in step S830 a query is performed to locate alternative payment methods to which the customer already subscribes. These alternative payment methods can be, for example, any e-commerce business model that allows payments and money transfers to be made through the Internet. One example of such service is PayPal® as well as E-Cash, the Ripple Monitory System, PayMate, and Google Check-Out. If an alternative payment method is not found, control continues to step S842 where the customer is asked to confirm the reservation information and/or utilize the pre-authorization model.

Figure 9:
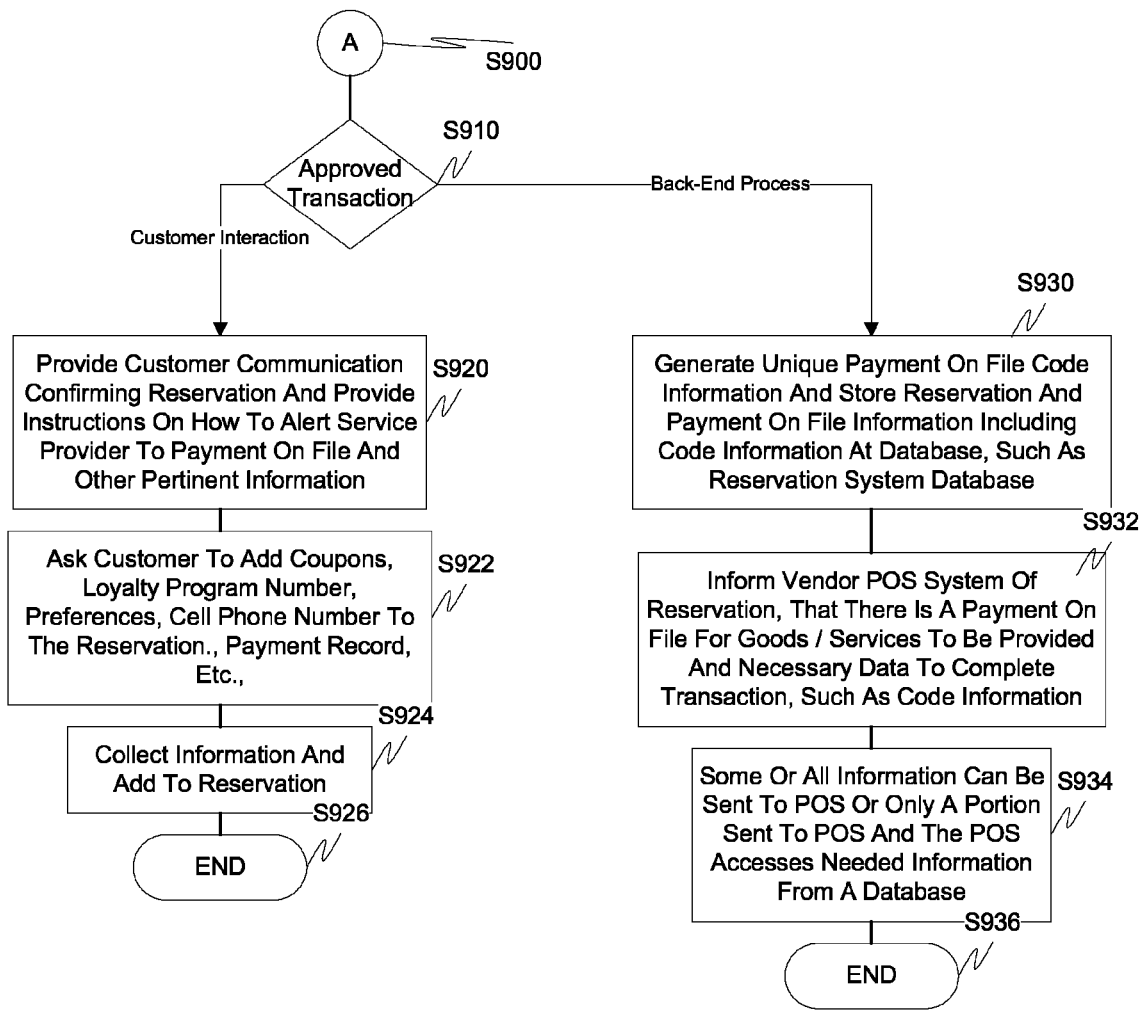
FIG. 9 is a flowchart further illustrating the method of FIG. 8.

In step S850, and if an alternative payment method is found, the customer can confirm their reservation and be provided with an interface (for example on a computer or mobile device) that allows a payment on file to be created. For example, in step S860, the necessary information can be requested from the customer such that the reservation system is able to access the payment on file account, such as the last four digits of the social security number (SSN), login information, billing information, or the like. With this information, the reservation system is able to communicate in step S870 with the payment on file system to approve the transaction. If the transaction is not approved, control jumps to step S800, otherwise control continues to step S890 to Step S900 in FIG. 9.

Alternatively, the system could capture the customer's email address and, using known techniques (such as reverse lookup) perform a search to determine if the customer has a payment on file account. If such an account is located, the customer could simply automatically be presented with an option to attach or otherwise associate that account with the transaction.

In step S880, and if the transaction is not approved, the customer can be asked if they want to use another payment on file record and, if so, control returns to step S860.

Once the transaction is approved, two options are available in step S910. In the first option, control continues to step S920 where the customer can be provided with confirmation of the reservation via confirmation, such as an e-mail, SMS message, voice message, or the like, and also be provided with instructions on how to alert the service provided to the payment on file, and optionally any other pertinent information. The customer can also, in step S922, add coupons, loyalty program numbers, preferences, cell phone number, address information, shipping information, payment record, or any other relevant information as needed. This information then can be collected in step S924 and added to the reservation. Control then continues to step S926 where the control sequence ends.

On the back-end in option two, control continues to step S930 where a unique payment on file code is generated and stored in database in conjunction with the reservation. The payment on file information can include code information at the database, such as the reservation system database. Next, in step S932, the vendor's point of sale system is informed of the reservation, that there is a payment on file for goods and/or services to be provided, and any other necessary data to complete the transaction, such as the code information. Some or all of the above information can be sent in step S934 to the point of sale, or only a portion sent to the point of sale with the point of sale accessing needed information from the database. Control then continues to step S936 where the control sequence ends.

The present invention, in various embodiments, includes components, methods, processes, systems and/or apparatus as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

A number of variations and modifications of the invention can also be used. It would be possible to provide or claim some features of the invention without providing or claiming others.

The exemplary systems and methods of this invention have been described in relation to enhancing device operation through context monitoring. However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system collocated; certain components of the system can be located remotely, at distant portions of a distributed network, such as a LAN, cable network, and/or the Internet, or within a dedicated system. Thus, it should be appreciated, that the components of the system can be combined in to one or more devices, such as a gateway, or collocated on a particular node of a distributed network, such as an analog and/or digital communications network, a packet-switch network, a circuit-switched network or a cable network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, a cable provider, enterprise system, in one or more communications devices, at one or more users' premises, or some combination thereof. Similarly, one or more functional portions of the system could be distributed between a communications device(s) and an associated computing device.

Furthermore, it should be appreciated that the various links, such as link 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention.

Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A payment method comprising:
identifying a payment on file at a point of sale device of a vendor corresponding to a reservation for purchase of one or more of goods and services to be provided by the vendor, the payment on file being identified based on customer information received at the point of sale device, the received customer information not including financial information of the customer, the payment on file having been previously stored and associated with payment code information, the payment on file including one or more identifiers that identify one or more of the goods, the services, and the vendor the purchase will be made with corresponding to the reservation, the payment on file being a preauthorization for the purchase including a dollar amount limit of credit that is preauthorized for the purchase, the payment on file being used so that the vendor is never provided with a customer's financial information;
based on the identified payment on file, creating a ticket correlated to the payment on file, at the point of sale device of the vendor, the ticket being correlated to a profile stored in accordance with the payment on file of the customer, and the ticket including the payment code information;
receiving, at the point of sale device, an indication of a checkout method of checking out from the reservation provided by the vendor, the checkout method including one or more of:
express checkout,
self check out, and
alternative checkout; and
subsequent to receiving indication of the checkout, the point of sale device sending the ticket to a computing device associated with the customer, the ticket indicating the one or more of goods and services provided by the vendor corresponding to the reservation and a corresponding payment to be paid, and requesting payment from the payment on file based on the payment code information, the payment being provided to the vendor without the vendor ever being provided with a customer's financial information.

2. The method of claim 1, further comprising automatically detecting a presence of one or more devices and receiving from a detected device an identification of a reservation at the point of sale device based on the customer information.

3. The method of claim 1, further comprising populating the ticket with information related to the one or more of goods and services purchased.

4. The method of claim 1, further comprising creating the reservation and associating the payment on file with the reservation.

5. The method of claim 1, further comprising providing information to the customer as to how to alert a merchant about the payment on file.

6. The method of claim 1, wherein the payment of file is represented by a unique payment on file code.

7. The method of claim 1, wherein the express checkout further includes the point of sale confirming the ticket is complete and securing customer authorization for the ticket.

8. The method of claim 1, wherein the self check out further includes a mobile device communicating with the point of sale to exchange ticket information and authorization information.

9. The method of claim 1, wherein a reservation is associated with the payment on file.

10. A non-transitory computer readable storage media having instructions stored thereon that, when executed by at least one processor, cause one or more computing devices to perform the steps of claim 1.

11. A payment system comprising:
a reservation system that identifies a payment on file at a point of sale device of a vendor corresponding to a reservation for purchase of one or more of goods and services to be provided by the vendor, the payment on file being identified based on customer information received at the point of sale device, the received customer information not including financial information of the customer, the payment on file having been previously stored and associated with payment code information, the payment on file including one or more identifiers that identify one or more of the goods, the services, and the vendor the purchase will be made with corresponding to the reservation, the payment on file being a preauthorization for the purchase including a dollar amount limit of credit that is preauthorized for the purchase, the payment on file being used so that the vendor is never provided with a customer's financial information; and a point of sale device associated with a vendor that creates a ticket based on the identified payment on file, the ticket being correlated to a profile stored in accordance with the payment on file of the customer, and the ticket including the payment code information, wherein a checkout method of checking out from the reservation provided by the vendor, to complete a sale include one or more of:

express checkout, self check out, and alternative checkout; and subsequent to receiving indication of the checkout, the point of sale device sending the ticket to a computing device associated with the customer, the ticket indicating the one or more of goods and services provided by the vendor corresponding to the reservation and a corresponding payment to be paid, and requesting payment from the payment on file based on the payment code information, the payment being provided to the vendor without the vendor being provided with a customer's financial information.

12. The system of claim 11, further comprising a vendor system that automatically detects a presence of one or more devices and receives, from a detected device, an identification of the reservation based on the customer information.

13. The system of claim 11, wherein the point of sale device further populates the ticket with information related to one or more of goods and services purchased.

14. The system of claim 11, wherein the reservation is created in the reservation system and associated with the payment on file.

15. The system of claim 11, wherein the reservation system further provides information to the customer as to how to alert a merchant about the payment on file.

16. The system of claim 11, wherein the payment of file is represented by a unique payment on file code.

17. The system of claim 11, wherein the express checkout further includes the point of sale confirming the ticket is complete and securing customer authorization for the ticket.

18. The system of claim 11, wherein the self check out further includes a mobile device communicating with the point of sale to exchange ticket information and authorization information.

19. The system of claim 11, further including a credit issuing system.

20. The system of claim 11, further comprising a credit acquisition system.

* * * * *